June 18, 1963 E. M. DAVIS, JR 3,094,631

PULSE COUNTER USING TUNNEL DIODES AND HAVING AN ENERGY STORAGE DEVICE ACROSS THE DIODES

Filed March 1, 1960 2 Sheets-Sheet 1

INVENTOR
EDWARD M. DAVIS, JR
BY MITCHELL & BECHERT
ATTORNEYS

June 18, 1963 E. M. DAVIS, JR 3,094,631

PULSE COUNTER USING TUNNEL DIODES AND HAVING AN ENERGY STORAGE DEVICE ACROSS THE DIODES

Filed March 1, 1960 2 Sheets-Sheet 2

United States Patent Office 3,094,631

Patented June 18, 1963

3,094,631

PULSE COUNTER USING TUNNEL DIODES AND HAVING AN ENERGY STORAGE DEVICE ACROSS THE DIODES

Edward M. Davis, Jr., Poughkeepsie, N.Y., assignor to International Business Machines Corporation, New York, N.Y., a corporation of New York Filed Mar. 1, 1960, Ser. No. 12,187
8 Claims. (Cl. 307—88.5)

This invention relates to a high speed current pulse counter, and more particularly to such counter utilizing tunnel diodes.

It is a primary object of this invention to provide a counter capable of extremely high speed and which is relatively inexpensive to produce as compared to comparable prior art counters.

It is a feature of the invention to accomplish the above-mentioned object by utilizing tunnel diodes as the counting elements.

In accordance with an aspect of the invention, there is provided a current pulse counter comprising a plurality of tunnel diodes connected in series, the number of diodes corresponding to the order of counting. Current pulses, the number of which it is desired to count, are applied to the diodes and are capable of switching the diodes seriatim from a first stable state to a second stable state. The plurality of diodes exhibit a composite voltage characteristic. A current of predetermined amplitude is applied to the tunnel diodes to establish a current-voltage load line which intersects the composite characteristic at different voltage levels, at least some of which are indicative of stable operating points. The current pulses which are applied to the diodes are capable of shifting the diodes individually through their negative resistance regions from one stable operating point to another, and to develop in an energy storage device connected across the diodes a voltage having a magnitude representative of the number of pulses applied to the diodes.

The above-mentioned and other features and objects of this invention and the manner of attaining them will become more apparent and the invention itself will be best understood by reference to the following description of a particular embodiment of the invention taken in conjunction with the accompanying drawing, wherein.

An essential element of the invention is a tunnel diode, sometimes also called an Esaki diode. For simplicity, the diodes will be referred to hereinafter as tunnel diodes. Two important features of such a diode are, first, its bistable nature which is achieved because its voltage-current characteristic exhibits a negative resistance region, and, second, its extremely high speed of response to an applied current wave or pulse. For a discussion of such a diode, reference may be had to an article entitled "New Phenomenon in Narrow Germanium p-n Junctions," Physical Review, 1958, vol. 109, pages 603 and 604, by L. Esaki.

Figure 1:
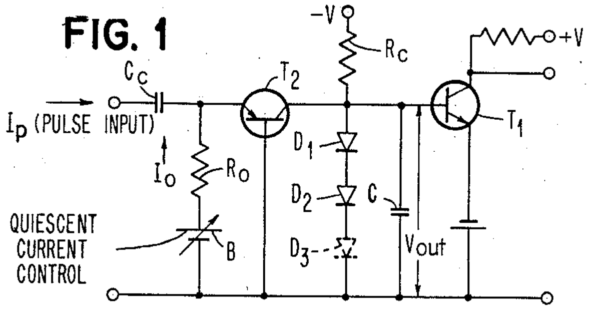
FIG. 1 is a schematic diagram of the novel counter.

Referring first to FIG. 1, the novel counter comprises a plurality of tunnel diodes, two diodes $D_1$ and $D_2$ being shown in solid lines, and a suggested third diode in dash lines. Of course, additional diodes may be employed and, as will become clear later in the description, the order of counting corresponds to the number of diodes employed. The diodes are connected in series or cascade across an output circuit comprising an energy storage device, such as a capacitor C, and an NPN transistor amplifier $T_1$ which is biased in the conventional manner.

The counter also comprises an input circuit comprising a source of constant current, which is shown schematically as consisting of an adjustable source of energy B and a resistor $R_0$. The source of energy supplies a constant current $I_0$ to a low impedance input circuit comprising a PNP transistor $T_2$ which in turn acts as a current source for the tunnel diodes. Collector bias for the transistor $T_2$ is derived from a source —V connected to the collector through a resistor $R_c$.

Figure 2:
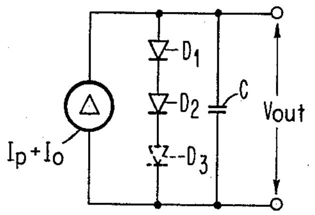
FIG. 2 is an equivalent circuit diagram of the schematic diagram shown in FIG. 1.

Current pulses $I_p$ are applied over an input terminal to a coupling capacitor $C_c$ and then to the input transistor $T_2$. As may be seen from the equivalent circuit diagram of FIG. 2, the counter is extremely simple in construction, and in addition to the benefits which are derived through its simplicity, the counter is also extremely fast and reliable.

Figure 3:
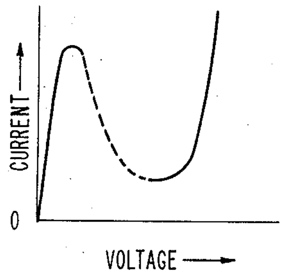
FIG. 3 is a current-voltage characteristic curve of a tunnel diode.
Figure 4:
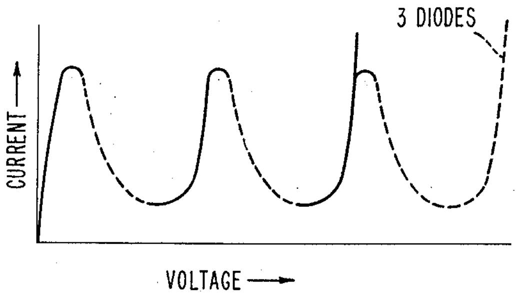
FIG. 4 is a composite voltage-current characteristic curve of a plurality of diodes connected in series.

A typical voltage-current characteristic curve of a tunnel diode is shown in FIG. 3 with the negative resistance region thereof being shown by a dash line. In FIG. 4 a composite voltage-current characteristic curve is shown for two diodes and by dash lines the characteristic curve is extended for a suggested third diode.

It is to be understood that the composite characteristic does not necessarily represent the characteristic curves for the first, second and third diodes, $D_1$, $D_2$ and $D_3$ in the same order as they appear in the chain. As a practical matter, the diodes have different maximum currents at the peaks of their voltage-current characteristics and, in general, the order of switching is from the lowest current diode to the highest current diode irrespective their physical locations in the chain. If the diodes $D_1$, $D_2$ and $D_3$ are such that their maximum current increases, from $D_1$ to $D_3$, then upon application of the first three current pulses $I_p$, $D_1$ will switch first, $D_2$ second and $D_3$ third. The switching of $D_3$ signifies counting by three. If a fourth diode were included in the chain, the order of counting would equal four. Before leaving the discussion on the composite characteristic curve, it should be observed that, because of the voltage-current characteristic of the terminal diode, the trailing slope of the first characteristic merges with the leading slope of the next characteristic, and so on.

Figure 5:
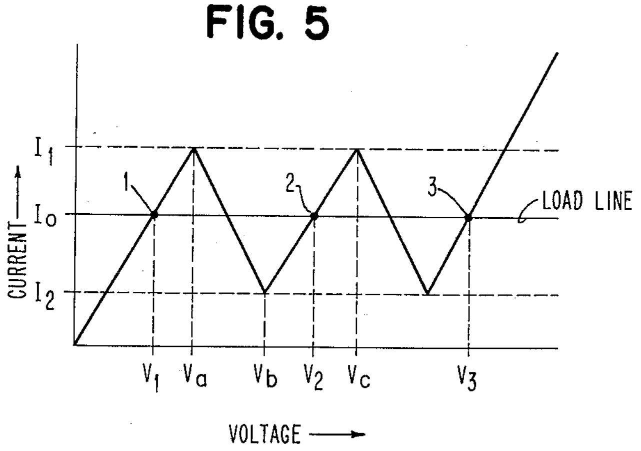
FIG. 5 is a simplified representation of the composite characteristic curve showing operating points of the counter circuit.

In FIG. 5 a straight line approximation has been employed to represent the characteristic curve of FIG. 4.

Figure 6:
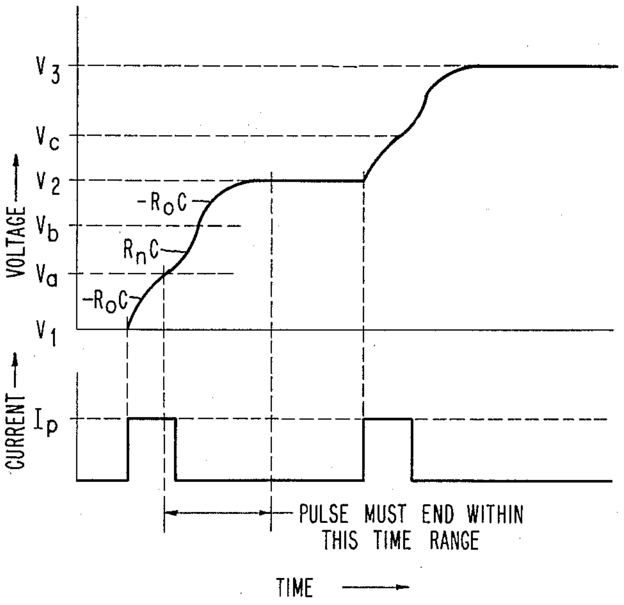
FIG. 6 shows two related waveforms, the upper one being the output of the counter and the lower waveform being the applied pulses to the counter input.

When power is first applied, the current $I_o$ establishes a current-voltage load line which intersects the composite characteristic at points 1, 2 and 3, which are points of stable operation. As can be seen in FIGS. 5 and 6, the points 1, 2 and 3 are at different and higher voltage levels respectively. Since point 1 is the only point of stable operation on the forward slope of the first characteristic, all diodes will be in their low voltage state, resulting in an output voltage of $V_1$.

Upon application of the first input current pulse $I_p$, and assuming $I_p$ is greater than $I_1-I_o$, the output voltage $V_{out}$ across the capacitor C will rise towards $R_o(I_o+I_p)$, with a time constant of $-R_oC$. When the voltage across the diode chain reaches $V_a$, the time constant changes to $+R_nC$ and the voltage continues to rise. At $V_b$ the time constant again changes to $-R_oC$ and the unit becomes stable at operating point 2 with an output voltage of $V_2$.

As can be seen in FIG. 6, the duration of the input current pulse $I_p$ is greater than the time required for the circuit to reach $V_a$ but less than the time required for the circuit to reach voltage $V_c$.

Upon application of another current pulse, satisfying the conditions discussed above, the counter switches to operating point 3. When the circuit is operating at point 3, the output voltage is $V_3$.

As a practical matter, the voltage swings in tunnel diodes are relatively small and, as shown in FIG. 1, a common emitter connected transistor $T_1$ is used at the output to produce the desired voltage amplification. Since the voltage swings are small, the conduction of current into the transistor $T_1$ as the counter changes operating points is also small when compared to the current conducted through the diodes. As seen, the current $I_o$ also supplies the quiescent base current for the output transistor $T_1$.

The counter may also be made to count down by simply applying pulses of opposite polarity. Application of such pulses causes the diodes to switch from a high voltage operating state to a low voltage operating state in the reverse order in which positive counting was effected. Further, the counter may be used with direct-current logic circuits by using a capacitor having a small capacitance, thus differentiating the output current steps to form a spike.

Figure 7:
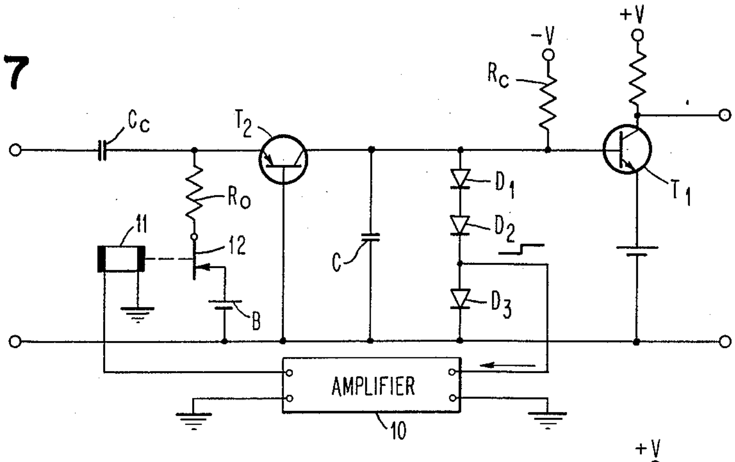
FIG. 7 is a circuit diagram of a counter including a potential form of resetting arrangement.

When used for counting up purposes, the circuit of FIG. 1 may be modified as represented in FIG. 7 to include a reset mechanism. Assuming diode $D_3$ is the last diode to be turned on during a counting operation, it may be connected through an amplifier 10 to a relay winding 11 which controls a normally closed switch contact 12. When the diode $D_3$ is rendered conductive, the pulse or step appearing at its anode is amplified by amplifier 10 and is applied to winding 11. The latter opens contact 12 and turns off the flow of current to the tunnel diodes, thereby resetting the counter.

Figure 8:
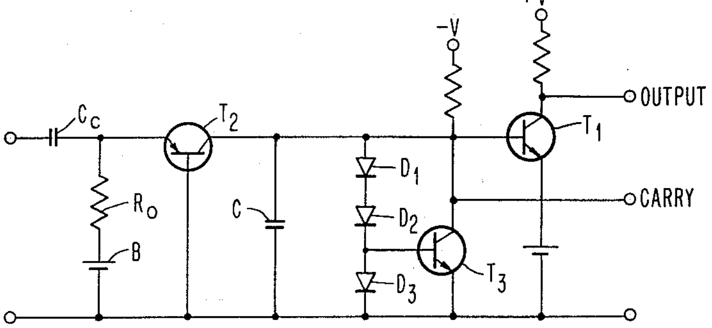
FIG. 8 represents a counter with a modified resetting arrangement.

In the alternative type of reset mechanism represented in the counter of FIG. 8, it is assumed that the diodes $D_3$, $D_2$ and $D_1$ have current carrying capabilities and also capacitances which decrease in the order of the enumeration. An NPN transistor $T_3$ has its emitter-base input circuit connected across the diode $D_3$ and its collector-emitter circuit connected across the series combination of the diodes $D_1$, $D_2$ and $D_3$. When the last diode $D_3$ is rendered conductive, it renders transistor $T_3$ conductive and discharges the capacitor C, thus restoring the counter to its original condition. A carry pulse may be taken from the collector of the transistor $T_3$.

While the foregoing description sets forth the principles of the invention in connection with specific circuitry, it is to be understood that this description is made only by way of example and not as a limitation of the scope of the invention as set forth in the objects thereof and in the accompanying claims.

I claim:

1. A current pulse counter, comprising a plurality of tunnel diodes connected in series, the number of diodes corresponding to the order of counting, means for applying current pulses to said diodes capable of switching each of said diodes seriatim from a first stable state to a second stable state, and an energy storage device connected across said tunnel diodes, whereby as the diodes are switched energy is stored in said storage device, the magnitude of the energy being representative of the number of pulses applied to said diodes.

2. The counter according to claim 1, and further comprising means connected to said diodes for supplying thereto a predetermined current effective to establish a current-voltage load line intersecting the composite characteristic of the plurality of diodes at different voltage levels, at least some of which are indicative of stable operating points, whereby the amplitude of the current pulse need only be sufficient to switch a diode from one stable state as established by said predetermined current to the other stable state.

3. A current pulse counter, comprising a plurality of tunnel diodes connected in cascade, the number of diodes corresponding to the order of counting, each diode having a voltage-current characteristic including a negative resistance region and capable of operating in either of two stable states, the composite characteristic of the plurality of diodes merging the trailing slope of one characteristic with the leading slope of next characteristic, output circuit means including an energy storage device coupled across said diodes, and means for applying a current pulse to said counter capable of switching a diode from one state to the other, the other state constituting the first state for the diode next to be switched, whereby upon application of successive current pulses, successive diodes are switched seriatim from one state to the other.

4. A pulse counter comprising a plurality of semi-conductor devices connected in cascade and having a plurality of negative resistance regions in the composite current-voltage characteristic thereof, output circuit means including an energy storage device connected across said semiconductor devices, means connected to said devices for supplying thereto a predetermined current which is effective to establish a current-voltage load line which intersects said composite characteristic at different voltage levels, at least some of which are indicative of stable operating points, and input circuit means connected to said devices for applying thereto current pulses which are effective to switch said devices individually through their negative resistance regions from one stable operating point to another, to develop at said output means a voltage having a magnitude representative of the number of pulses applied to said input means.

5. The counter according to claim 4, wherein said semi-conductor devices comprise tunnel diodes.

6. The counter according to claim 5 wherein said plurality of tunnel diodes are adapted to be switched at different levels of said current pulses whereby said diodes are switched seriatim, and further comprising means for resetting said counter to its initial condition, including a feedback circuit from the last of said diodes to be switched to said current supply means, and switching means under control of said feedback circuit for momentarily interrupting said current supply means in response to the switching of the last diode to be switched, whereby upon re-establishment of said predetermined current said counter assumes its initial condition.

7. The counter according to claim 5, wherein said plurality of tunnel diodes are adapted to be switched at different levels of said current pulses, whereby said diodes are switched seriatim, and further comprising means for resetting said counter to its initial condition, including a normally inoperative electron discharge device coupled across said energy storage device, said electron discharge device having two electrodes coupled across the last of said diodes to be switched and responsive to the switching thereof to cause said electron discharge device to conduct and discharge said energy storage device, whereby in the absence of stored energy across said diodes, the diodes assume their first stable state.

8. A current pulse counter comprising a plurality of tunnel diodes connected in cascade, each diode being capable of storing energy in either of two stable states, one state representing relatively low energy storage and the other state representing relatively high energy storage, an energy storage device across said plurality of diodes, and means for applying successive current pulses to said diodes for causing said diodes to switch seriatim from the relatively low energy state to the relatively high energy state, whereby the energy stored in said storage device is indicative of the number of pulses applied to said counter.

References Cited in the file of this patent

UNITED STATES PATENTS

| | | |
|---|---|---|
| 2,275,460 | Page | Mar. 10, 1942 |
| 2,284,101 | Robins | May 26, 1942 |
| 2,837,652 | Nailen | June 3, 1958 |
| 2,849,653 | Bleam | Aug. 26, 1958 |
| 2,903,604 | Henle | Sept. 8, 1959 |